United States Patent
Wang et al.

(10) Patent No.: US 10,715,238 B2
(45) Date of Patent: Jul. 14, 2020

(54) OUTCOME BASED RECEIVER BEAM TUNING

(71) Applicant: AT&T Intellectual Property I, L.P., Atlanta, GA (US)

(72) Inventors: Xiaoyi Wang, Austin, TX (US); Salam Akoum, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/366,297

(22) Filed: Mar. 27, 2019

(65) Prior Publication Data

US 2020/0106502 A1 Apr. 2, 2020

Related U.S. Application Data

(60) Provisional application No. 62/738,609, filed on Sep. 28, 2018.

(51) Int. Cl.
*H04B 7/06* (2006.01)
*H04B 17/24* (2015.01)
(Continued)

(52) U.S. Cl.
CPC ......... *H04B 7/0626* (2013.01); *H04B 7/0639* (2013.01); *H04B 7/0695* (2013.01);
(Continued)

(58) Field of Classification Search
CPC .. H04B 7/0617; H04B 7/0626; H04B 17/318; H04B 7/0639; H04B 7/0413; H04L 5/0048
(Continued)

(56) References Cited

U.S. PATENT DOCUMENTS

| 5,335,362 A | 8/1994 | Vaisanen et al. |
| 5,475,871 A | 12/1995 | Shalev et al. |

(Continued)

FOREIGN PATENT DOCUMENTS

| WO | 2017123079 A1 | 7/2017 |
| WO | 2018031908 A1 | 2/2018 |

OTHER PUBLICATIONS

3GPP, 3rd Generation Partnership Project; Technical Specification Group Services and System Aspects; Release 15 Description; Summary of Rel-15 Work Items (Release 15), 3GPP TR 21.915 V0.0.1 (Mar. 2018), 28 pages.

(Continued)

*Primary Examiner* — Emmanuel Bayard
(74) *Attorney, Agent, or Firm* — Amin, Turocy & Watson, LLP

(57) ABSTRACT

An outcome-based receiver beam tuning is provided. A base station device can transmit a reference signal with a group of symbols corresponding to different transmit beams, while the reference signal instructs the user equipment to not perform receive beam sweeping. The user equipment device can report the transmit beam with the highest signal strength. The base station device can then transmit a reference signal using the transmit beam with the highest signal strength, while also informing the user equipment device to perform receive beam sweeping. By comparing the receive beam with the highest signal strength to the signal strength of the best transmit beam, the base station device can determine the density (e.g. periodicity) of CSI-RS with repetition "ON" transmission.

20 Claims, 11 Drawing Sheets

(51) Int. Cl.
*H04B 17/318* (2015.01)
*H04L 5/00* (2006.01)
(52) U.S. Cl.
CPC ........... *H04B 17/24* (2015.01); *H04B 17/318* (2015.01); *H04L 5/0048* (2013.01)
(58) Field of Classification Search
USPC .................... 375/148, 267, 299, 347–349
See application file for complete search history.

(56) References Cited

U.S. PATENT DOCUMENTS

| | | | |
|---|---|---|---|
| 6,009,124 | A | 12/1999 | Smith et al. |
| 7,873,337 | B2 | 1/2011 | Petro |
| 8,116,694 | B2 | 2/2012 | Kaaja et al. |
| 8,280,445 | B2 | 10/2012 | Yong et al. |
| 8,489,050 | B2 | 7/2013 | Han |
| 8,909,295 | B2 | 12/2014 | Zhu |
| 9,413,066 | B2 | 8/2016 | Zhu et al. |
| 9,843,307 | B2 | 12/2017 | Feldman et al. |
| 9,954,587 | B2 | 4/2018 | Zhu et al. |
| 10,091,662 | B1* | 10/2018 | Bendlin ................ H04W 24/02 |
| 2008/0226098 | A1* | 9/2008 | Haulick .............. G10L 21/0208 381/94.9 |
| 2013/0230088 | A1* | 9/2013 | Arad ...................... G01R 29/08 375/228 |
| 2016/0043781 | A1 | 2/2016 | Cho et al. |
| 2016/0277087 | A1 | 9/2016 | Jo et al. |
| 2017/0181183 | A1 | 6/2017 | Sung et al. |
| 2017/0181193 | A1* | 6/2017 | Park .................... H04B 17/318 |
| 2017/0201893 | A1* | 7/2017 | Seol ..................... H04B 7/0456 |
| 2017/0346513 | A1 | 11/2017 | Nezhad-ahmadi et al. |
| 2017/0373398 | A1 | 12/2017 | Komulainen et al. |
| 2018/0020363 | A1 | 1/2018 | Faxer et al. |
| 2018/0049042 | A1 | 2/2018 | Yu et al. |
| 2018/0092129 | A1* | 3/2018 | Guo .................... H04W 56/001 |
| 2018/0176948 | A1* | 6/2018 | Islam .................... H04W 52/50 |
| 2018/0199258 | A1 | 7/2018 | Cezanne et al. |
| 2018/0227031 | A1 | 8/2018 | Guo et al. |
| 2018/0254809 | A1 | 9/2018 | Huang |
| 2018/0324853 | A1* | 11/2018 | Jeon ...................... H04W 74/08 |
| 2018/0332544 | A1* | 11/2018 | Chakraborty ....... H04W 52/146 |
| 2019/0069208 | A1* | 2/2019 | Pefkianakis .......... H04W 84/12 |
| 2019/0190747 | A1* | 6/2019 | Park .................... H04W 52/146 |

OTHER PUBLICATIONS

Eltayeb, et al., "Opportunistic Beam Training with Hybrid Analog/Digital Codebooks for mmWave Systems," Signal and Information Processing (GlobalSIP), 2015 IEEE Global Conference, IEEE, Aug. 31, 2015, 5 pages.

Kim, et al., "Fast Millimeter-Wave Beam Training with Receive Beamforming," Journal of Communications and Networks, vol. 16, No. 5, Oct. 2014, 11 pages.

Mazin, et al., "Accelerating Beam Sweeping in mmWave Standalone 5G New Radios using Recurrent Neural Networks," IEEE VTC2018-Fall , Chicago, IL, USA, Aug. 27-30, 2018, 6 pages.

Palacios, et al., "Tracking mm-Wave Channel Dynamics: Fast Beam Training Strategies under Mobility," Infocom 2017—IEEE Conference on Computer Communications, IEEE, 2017, 9 pages.

Zhang, et al., "High Resolution CSI Feedback with Beam Space MIMO," Personal, Indoor, and Mobile Radio Communications (PIMRC), 2017 IEEE 28th Annual International Symposium, IEEE, Nov. 5, 2017, 5 pages.

* cited by examiner

OUTCOME BASED RECEIVER BEAM TUNING

CROSS-REFERENCE TO RELATED APPLICATIONS

This application is a non-provisional of U.S. Provisional Patent Application No. 62/738,609, filed on Sep. 28, 2018 entitled "OUTCOME BASED RECEIVER BEAM TUNING." The entirety of the aforementioned application is hereby incorporated herein by reference.

TECHNICAL FIELD

The present application relates generally to the field of mobile communications and, for example, to outcome based receiver beam tuning in a next generation wireless network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Various challenges exist to provide levels of service associated with forthcoming 5G and other next generation network standards. For example, wireless network resources can be wasted by having a user equipment repeatedly perform receive beam sweeping that can sometimes provide little or no benefit.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
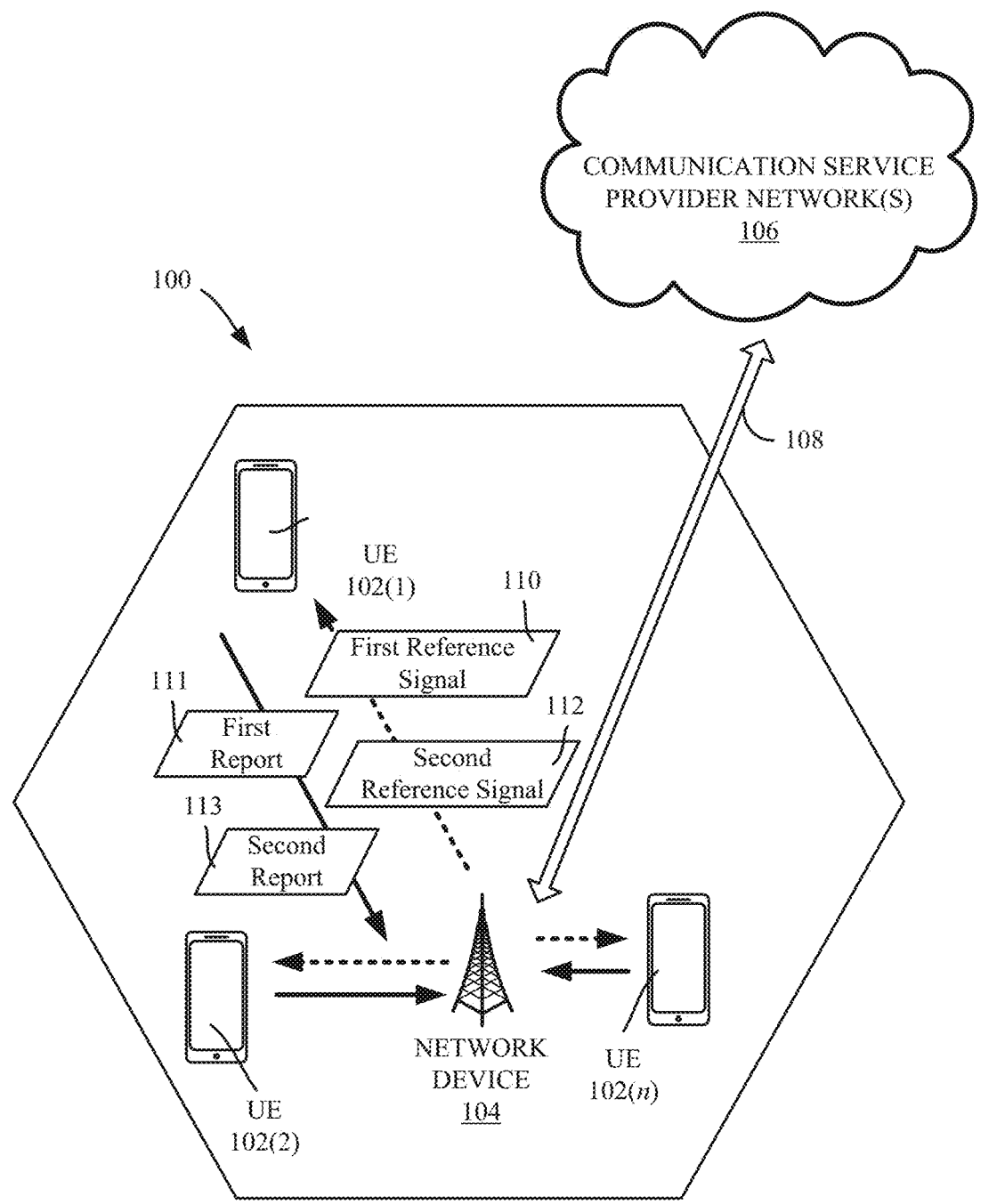
FIG. 1 illustrates an example wireless communication system, in accordance with various aspects and embodiments of the subject disclosure.

Various embodiments disclosed herein are directed towards an outcome-based receiver beam tuning technology. In one aspect, a base station device can transmit a reference signal with a group of symbols corresponding to different transmit beams, in which the reference signal instructs a user equipment (UE) to not perform receive beam sweeping. The user equipment device can report the transmit beam with the highest signals strength. The base station device can then transmit another reference signal using that transmit beam with the highest signal strength, while also informing the user equipment device to perform receive beam sweeping, and report the results. By comparing the receive beam with the highest signal strength to the signal strength of the best transmit beam, the base station device can determine the density (e.g., periodicity) of CSI-RS with repetition "ON" transmission, (where CSI-RS refers to "channel state information reference signal," which is used by a user equipment to estimate the channel and report channel quality information (CQI) to the base station device). In general, the poorer the channel quality, the greater the density of channel state information reference signals (up to some maximum number of resource elements in the resource block), and conversely the better the channel quality, the lesser the density of channel state information reference signals in the resource block.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

In some embodiments the non-limiting term radio network node or simply network node is used. It refers to any type of network node that serves UE and/or connected to other network node or network element or any radio node from where UE receives signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc.

The embodiments are described in particular for NR. The embodiments are however applicable to any RAT or multi-RAT system where the UE operates using multiple carriers e.g. LTE FDD/TDD, GSM/GERAN, Wi-Fi, WLAN, WiMax, CDMA2000 etc.

The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

Note that the embodiments disclosed herein apply equally for Multi RAB (radio bearers) on some carriers (that is data plus speech is simultaneously scheduled).

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 illustrates an example wireless communication system 100 in accordance with various aspects and embodiments of the subject disclosure. In one or more embodiments, system 100 can comprise one or more user equipments (UEs) 102(1)-102(n), each of which can have one or more antenna panels having vertical and horizontal elements, for example. A UE such as the UE 102(1) can be a mobile device such as a cellular phone, a smartphone, a tablet computer, a wearable device, a virtual reality (VR) device, a heads-up display (HUD) device, a smart car, a machine-type communication (MTC) device, and the like. The UE 102(1) can also refer to any type of wireless device that communicates with a radio network node in a cellular or mobile communication system. Examples of user equipments are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. A user equipment such as the UE 102(1) can also comprise IoT devices that communicate wirelessly. In various embodiments, system 100 is or comprises a wireless communication network serviced by one or more wireless communication network providers.

In example embodiments, a UE such as the UE 102(1) can be communicatively coupled via a network node/device 104 to a wireless communication network, e.g., a communication service provider network(s) 106 via a suitable communications link 108.

The non-limiting term network node (or radio network node) is used herein to refer to any type of network node/network device 104 serving the one or more user equipments (UEs) 102(1)-102(n) and/or connected to other network node, network element, or another network node from which the one or more user equipments (UEs) 102(1)-102(n) can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network device 104) can comprise but are not limited to: NodeB devices, base station (BS) devices, access point (AP) devices, and radio access network (RAN) devices. The network node can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the network node can be referred to as a gNodeB device.

The wireless communication system 100 can employ various cellular technologies and modulation schemes to facilitate wireless radio communications between devices (e.g., the UEs 102(1)-102(n) and the network device 104). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the nodes/devices (e.g., the UEs 102(1)-102(n) and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, the network node device 104 can enable outcome based receiver beam tuning. Traditionally, receiving beam tuning is introduced to assist UE to sweep its receiver beam and find the best one. The general procedure is that network can configure CSI-RS resource with repetition "ON". The same CSI-RS transmission is repeated for several OFDM symbols, whereby the UE can use different Rx beam to receive the same signal.

Receiver beam management is generally implemented by the UE. In other words, how the UE sweeps its receiver beam is fully up to a given UE implementation, and thus different chipset vendors may have different proprietary algorithms of receiver beam sweeping. Such principle is based on the idea that the UE is self-motivated to find the best beam; however, this is difficult for the network to implement, as the base station device has to remain in repetition "ON" mode, with the CSI-RS being continually transmitted, using a large amount of resources. The UE may skip sweeping the receiver beam from time to time, but the network may continue the transmit sweeping, wasting resources. To overcome this challenge, described herein is a way in which the network can control (to an extent) how a UE performs receiver beam sweeping in order to reduce the resources used to perform beam tuning.

In general, the technology described herein mandates a UE to report the outcome, e.g. RSRP (reference signal receive power), of receiver beam tuning, while still leaving the details of the receiving UE's tuning algorithm as proprietary. As represented in FIG. 1, the network device 104 transmits a first reference signal 110 comprising a group of symbols to a user equipment device, e.g., the UE 102(1), in which respective symbols of the group of symbols correspond to respective transmit beams, and the first reference signal indicates to the user equipment device 102(1) to not to perform receive beam sweeping. Based on the first reference signal, the UE device 102(1) sends a first measurement report 111 that is received by the network device 104, identifying a transmit beam of the respective transmit beams that has at least a first (e.g., the best) threshold signal strength. Subsequently, the network device 104 transmits a second reference signal 112 comprising a group of symbols corresponding to the identified transmit beam, in which the second reference signal indicates to the user equipment device to perform the receive beam sweeping. Based on the second reference signal, the UE device 102(1) sends a second measurement report 113 that is received by the network device 104 that identifies another receive beam that has at least a second (e.g., the best) threshold signal strength of receive beams swept by the user equipment device.

By comparing the first RSRP (before receiver beam tuning) in the report 111 with the second RSRP (after receiver beam tuning) in the report 113, the network device 104 can determine the effectiveness of the receiver beam tuning that the UE 102(1) performed. The network device 104 can thus determine the worth of configuring more CSI-RS to assist UE's receiver beam tuning, that is, the network device 104 can set the density of CSI-RS based on the effectiveness of the receiver beam tuning that the UE performed.

Figure 2:
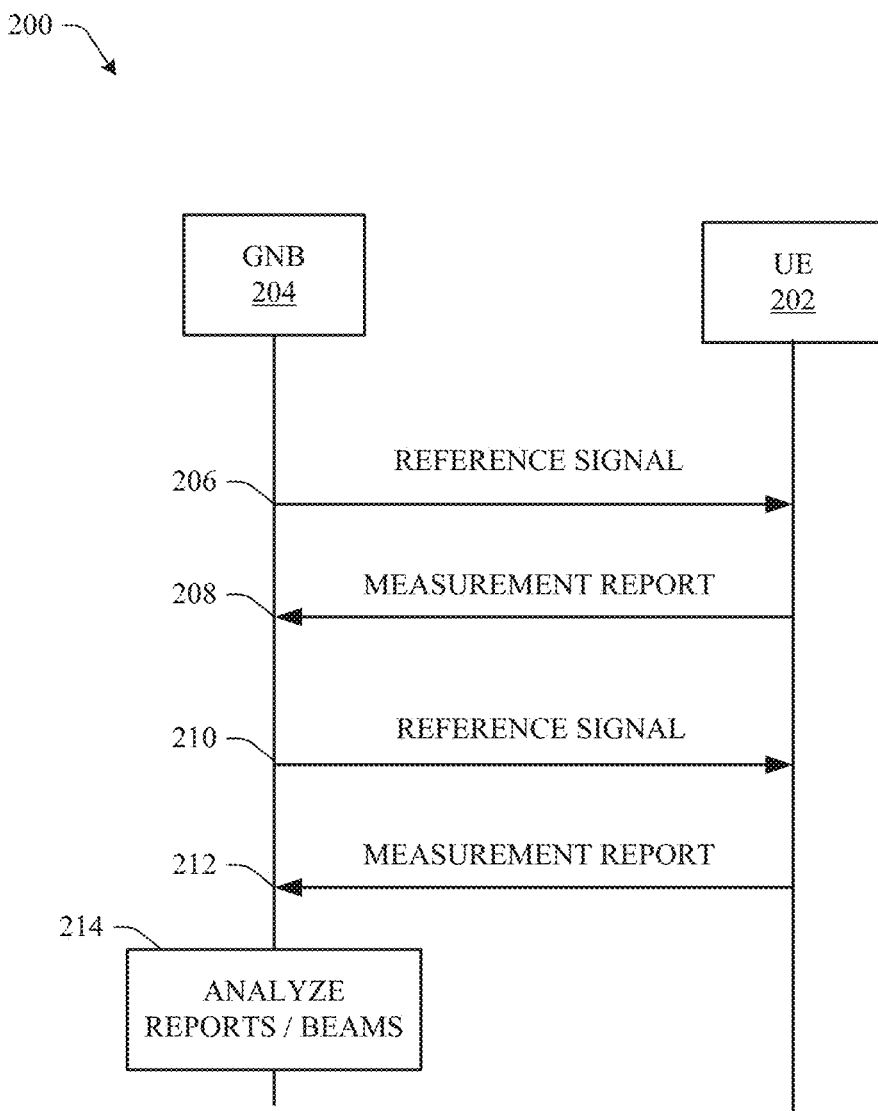
FIG. 2 illustrates an example message sequence chart in, accordance with various aspects and embodiments of the subject disclosure.

Turning now to FIG. 2, illustrated is an example message sequence chart 200 in accordance with various aspects and embodiments of the subject disclosure.

In an embodiment, a GNB 204 (corresponding to the network device 104 of FIG. 1) can transmit a first reference signal to a UE 202, as represented by the arrow labeled 206. The first reference signal can comprise a group of symbols each corresponding to a different transmit beam; the first reference signal also can comprise a first indication to the user equipment device to not perform receive beam sweeping.

As represented by the arrow labeled 208, the UE 202 can transmit a first measurement report from the user equipment device identifying a first transmit beam of the respective transmit beams, e.g., the transmit beam that has a highest signal strength relative to the others.

As represented by the arrow labeled 210, the GNB 204 can transmit a second reference signal comprising a group of symbols corresponding to the first transmit beam, in which the second reference signal comprises a second indication to the user equipment device to perform receive beam sweeping. The UE 202 thus performs the receive beam sweeping, and thus generates a second measurement report.

As represented by the arrow labeled 212, the UE 202 transmits the second measurement report from the user equipment device identifying a receive beam that has a highest signal strength of the receive beams swept by the user equipment device. As described herein, the GNB 204 can analyze (block 214) the measurement reports/transmit beam (first) versus receive beam (second report) relative signal strengths to determine whether the beam sweeping by the UE 202 was effective in increasing the signal strength/RSRP. The GNB 204 can thus select a CSI-RS density based on the results.

Figure 3:
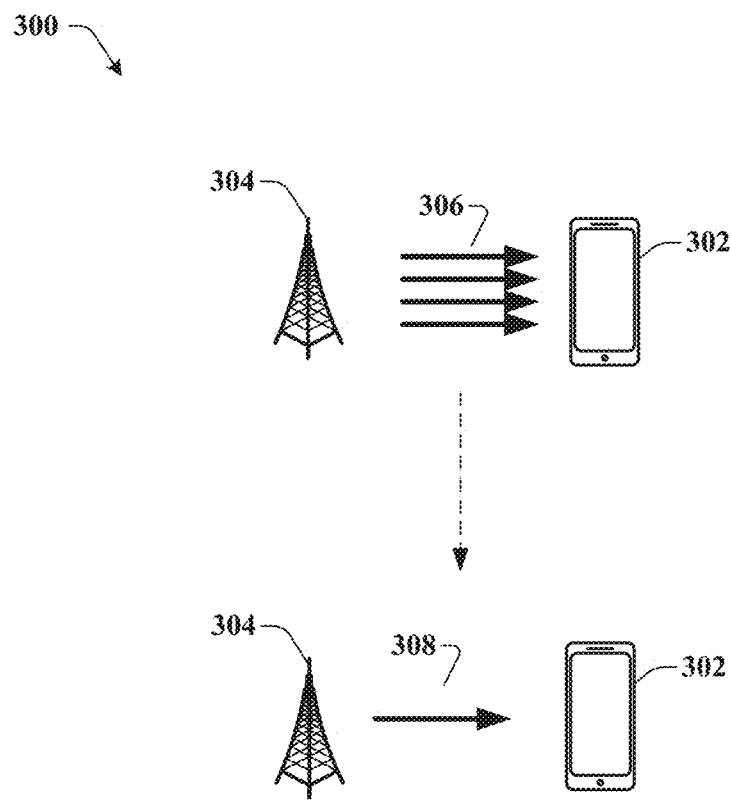
FIG. 3 illustrates an example block diagrams of mobile device and network node device performing outcome based receiver beam tuning, in accordance with various aspects and embodiments of the subject disclosure.

FIG. 3 illustrates an example block diagram of a mobile device 302 and network node device 304 performing outcome-based receiver beam tuning in accordance with various aspects and embodiments of the subject disclosure. In FIG. 3, the network node device 304 sends a reference signal 306 comprising a number of symbols corresponding to different transmit beams to UE 302. The reference signal 306 can comprise a group of symbols each corresponding to a different transmit beam and the first reference signal 306 can comprise a first indication to the user equipment device to not perform receive beam sweeping. The UE 302 responds with a first measurement report as described herein (not explicitly shown in FIG. 3).

The network node device 304 can then send a second reference signal 308 comprising a group of symbols corresponding to the first transmit beam, and wherein the second reference signal comprises a second indication to the user equipment device 302 to perform receive beam sweeping. The UE 302 responds with a second measurement report as described herein (not explicitly shown in FIG. 3).

Figure 4:
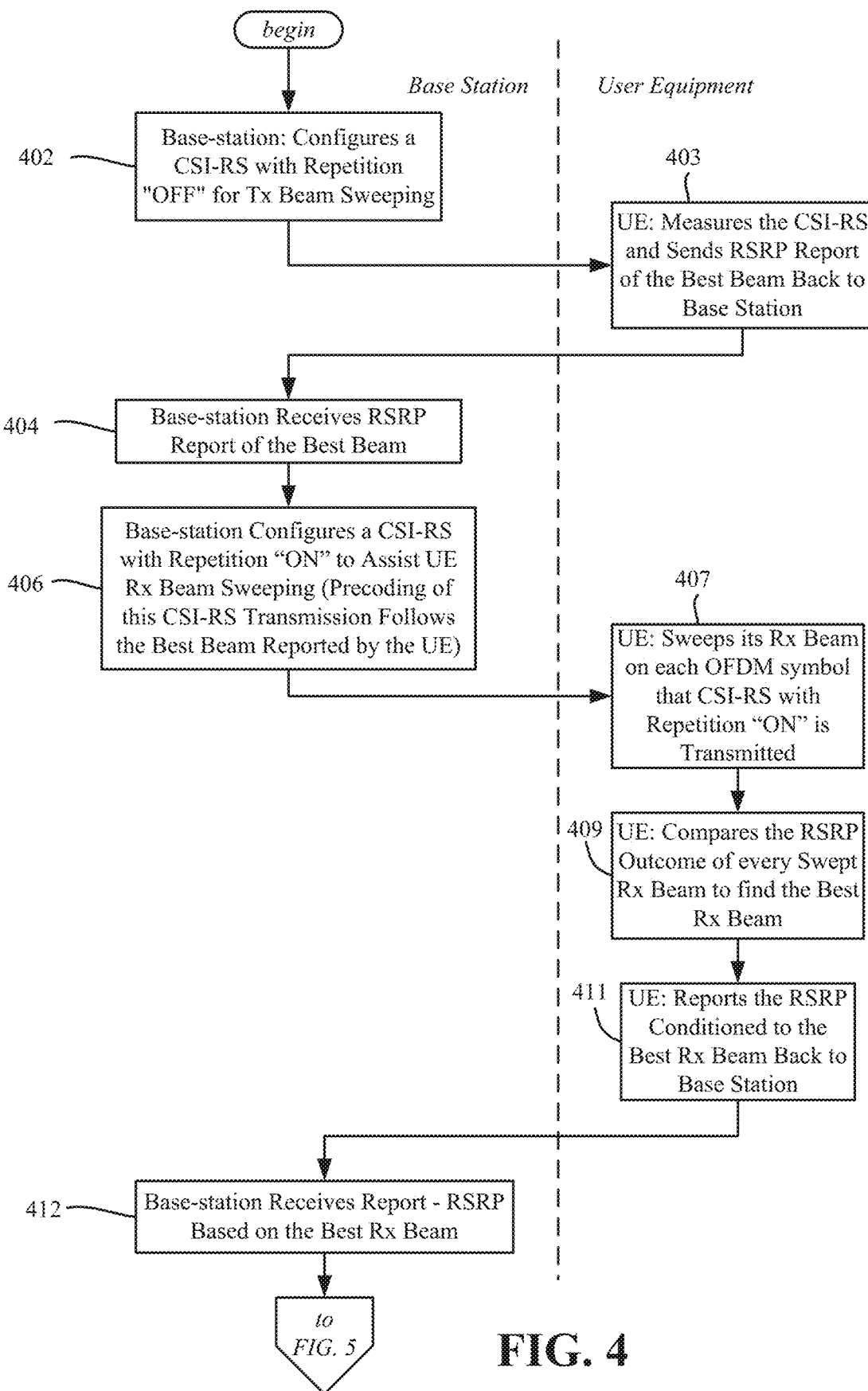
FIGS. 4 and 5 comprise a flow diagram showing example operations that a base station and user equipment can perform with respect to outcome based receiver beam tuning, in accordance with various aspects and embodiments of the subject disclosure.
Figure 5:
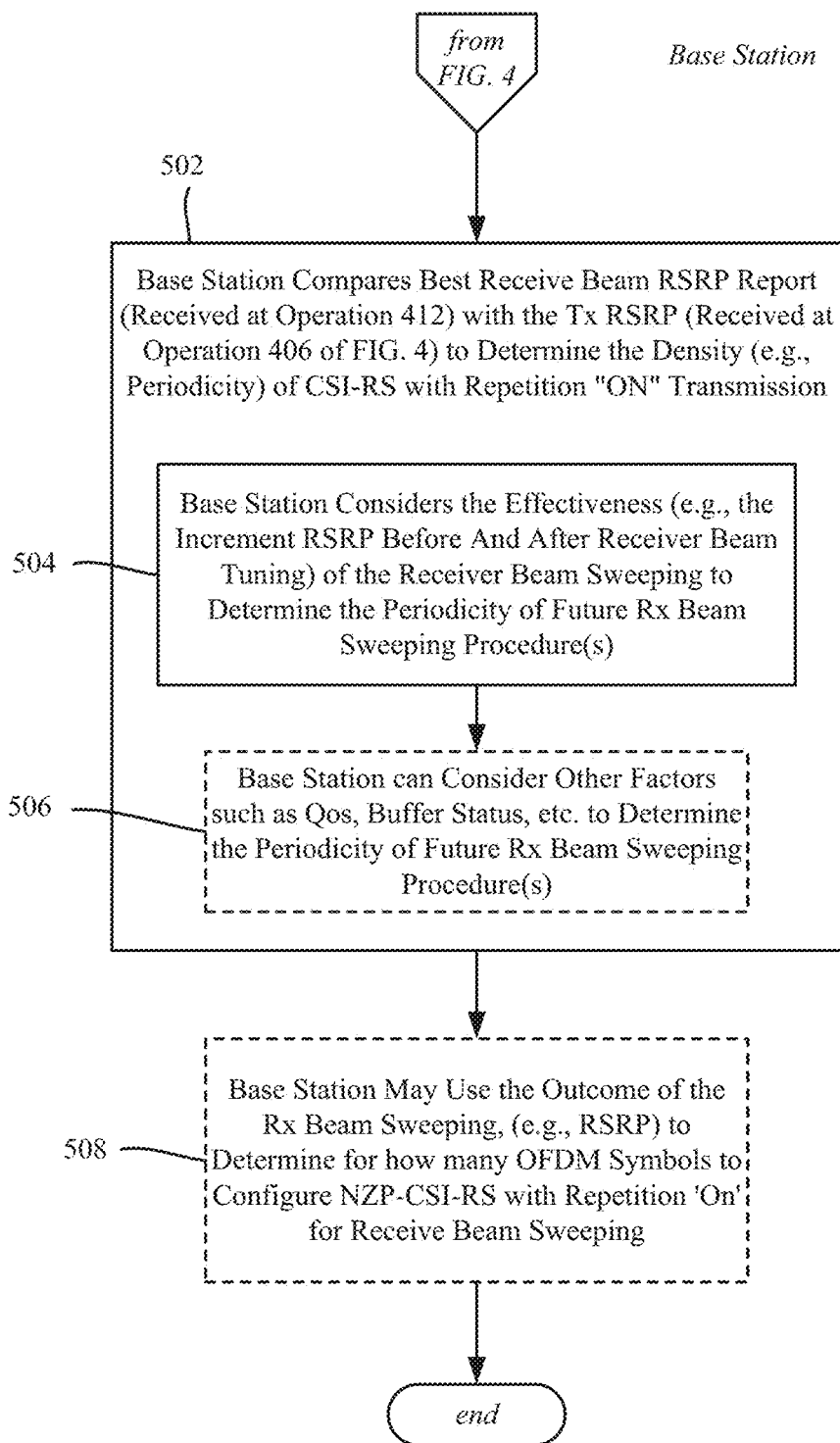

FIGS. 4 and 5 show example operations of implementations of the technology described herein. At operation 402, a network node device comprising a base station configures a channel state information reference signal (CSI-RS) with repetition "OFF" for transmit (Tx) beam sweeping by a user equipment (UE). At operation 403, the user equipment measures the CSI-RS, and sends an RSRP report of the best transmit beam back to the base station, which is received at operation 404. The reported RSRP is based on (conditioned to) the user equipment not performing any receive beam sweeping.

As represented by operation 406, the base station further configures a CSI-RS with repetition "ON" to assist the user equipment receive (Rx) beam sweeping. The precoding of this CSI-RS transmission may follow the best beam reported by the user equipment at operation 404.

As represented by operation 407, the user equipment sweeps a receive beam on each OFDM symbol on which CSI-RS with repetition "ON" is transmitted. At operation 409, the user equipment compares the RSRP outcome of every receive beam the user equipment has swept to find the best receive beam. At operation 4011, the user equipment reports the RSRP based on the best receive beam back to the base station The base station receives the report at operation 412. The process then continues at operation 502 of FIG. 5.

As represented by operation 502, after receiving the best receive beam report at operation 412 of FIG. 4, the base station compares the best receive beam RSRP with the RSRP received in Tx beam sweeping (at operation 406 of FIG. 4). The base station thus can determine the density (e.g. periodicity) of CSI-RS with repetition "ON" transmission. In particular, as represented by operation 504, the base station can consider the effectiveness, e.g. the change/incremental improvement, if any, of the first RSRP (before receiver beam tuning) relative to the second RSRP (after receiver beam tuning/receiver beam sweeping) to determine the periodicity of future Rx beam sweeping procedure(s).

Note that as represented by operation 506, the base station optionally can also consider other factors such as Quality of Service (of active PDP contexts e.g.), buffer statuses, and so forth to determine the periodicity of CSI-RS for future receive beam sweeping procedure(s).

Further, as represented by operation 508, in an operational operation/alternative implementation, the base station can use the outcome of the receive beam sweeping, e.g. RSRP, to determine for how many OFDM (orthogonal frequency division multiplexing) symbols to configure NZP-CSI-RS (non-zero power-channel state information-reference signal) resource set with a higher layer repetition parameter set to "ON") to perform receive beam sweeping, given a certain hierarchical structure or a grouping of beams at the receiver. The RSRP report can be used as an indication of the effectiveness of a certain subgroup of receive beams in achieving transmit/receive alignment.

Figure 6:
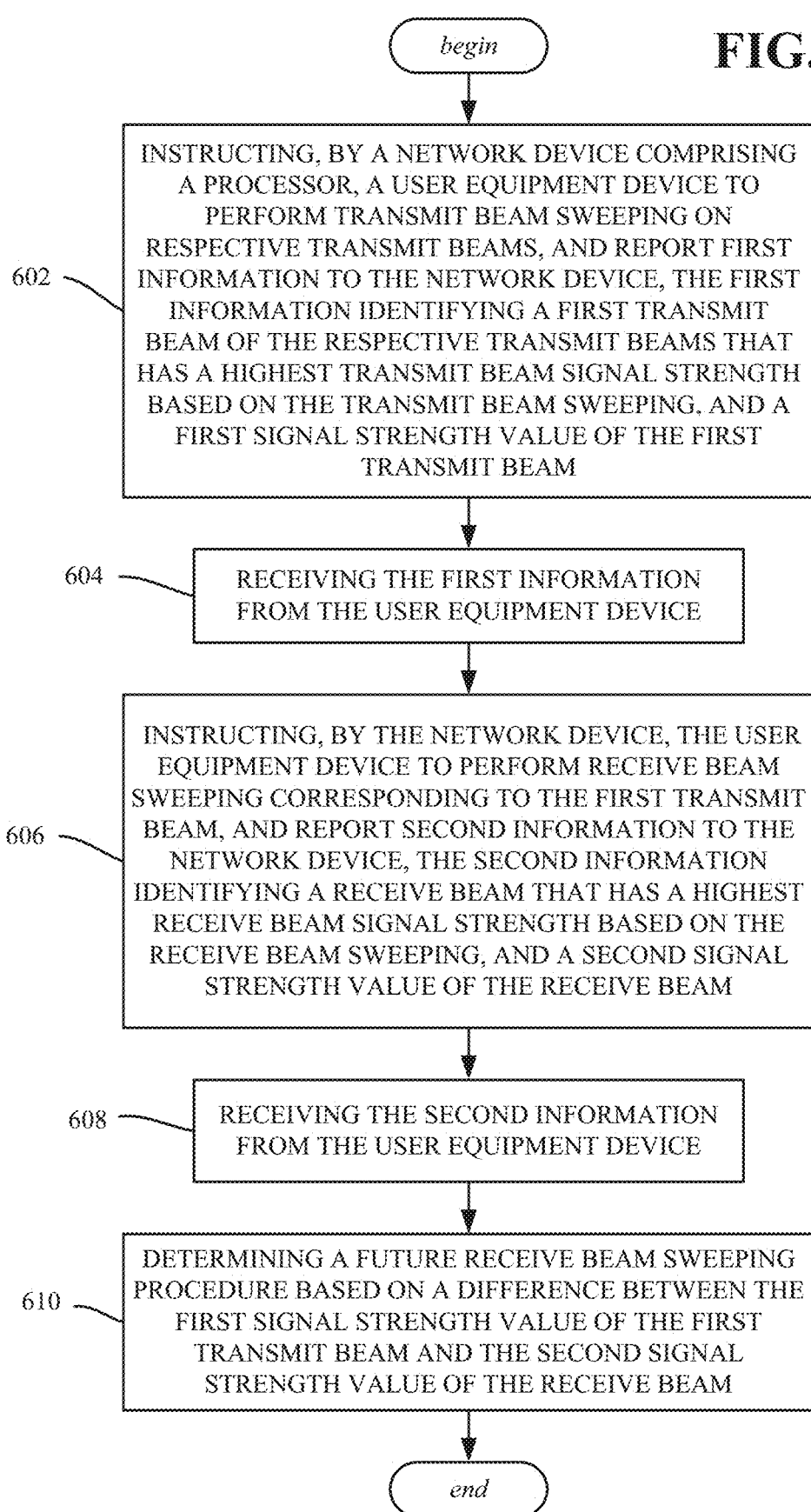
FIG. 6 is a flow diagram showing example operations of a network device that controls a user equipment to obtain information used for outcome based receiver beam tuning, in accordance with various aspects and embodiments of the subject disclosure.

One or more aspects, such as those implemented in example operations of a method, are shown in FIG. 6 in accordance with various aspects and embodiments of the subject disclosure. Operation 602 represents instructing, by a network device comprising a processor, a user equipment device to perform transmit beam sweeping on respective transmit beams, and report first information to the network device, the first information identifying a first transmit beam of the respective transmit beams that has a highest transmit beam signal strength based on the transmit beam sweeping, and a first signal strength value of the first transmit beam. Operation 604 represents receiving, by the network device, the first information from the user equipment device. Operation 606 represents instructing, by the network device, the user equipment device to perform receive beam sweeping corresponding to the first transmit beam, and report second information to the network device, the second information identifying a receive beam that has a highest receive beam signal strength based on the receive beam sweeping, and a second signal strength value of the receive beam. Operation 608 represents receiving, by the network device, the second information from the user equipment device. Operation 610 represents determining, by the network device, a future receive beam sweeping procedure based on a difference between the first signal strength value of the first transmit beam and a second signal strength value of the receive beam.

Instructing the user equipment device to perform the transmit beam sweeping on the respective transmit beams can comprise configuring the user equipment device for channel state information reference signal reporting with repetition turned off. Instructing the user equipment device to perform the receive beam sweeping can comprise configuring the user equipment device for channel state information reference signal reporting with repetition turned on.

Instructing the user equipment device to perform the transmit beam sweeping on the respective transmit beams can comprise transmitting a first reference signal comprising a first group of symbols to the user equipment device, wherein respective symbols of the first group of symbols correspond to the respective transmit beams. Instructing the user equipment device to perform the receive beam sweeping can comprise transmitting a second reference signal comprising a second group of symbols corresponding to the first transmit beam.

Determining the future receive beam sweeping procedure can comprise determining a reference signal density corresponding to a subsequent receive beam sweeping operation by the user equipment device after the receive beam sweeping. Determining the future receive beam sweeping procedure can comprise determining a periodicity for performance of subsequent receive beam sweeping after the receive beam sweeping.

Determining the future receive beam sweeping procedure can be based on a quality of service indication of an active packet data protocol context associated with the user equipment device. Determining the future receive beam sweeping procedure can be based on a buffer indication associated with the user equipment device.

Determining the future receive beam sweeping procedure can comprise determining at least one of a first periodicity for performance of receive beam sweeping based on a quality of service indication of an active packet data protocol context associated with the user equipment device, and/or a second periodicity for performance of receive beam sweeping based on a buffer indication associated with the user equipment device. Determining the future receive beam sweeping procedure can comprise determining a number of orthogonal frequency division multiplexing symbols to configure a non-zero power-channel state information-reference signal.

Figure 7:
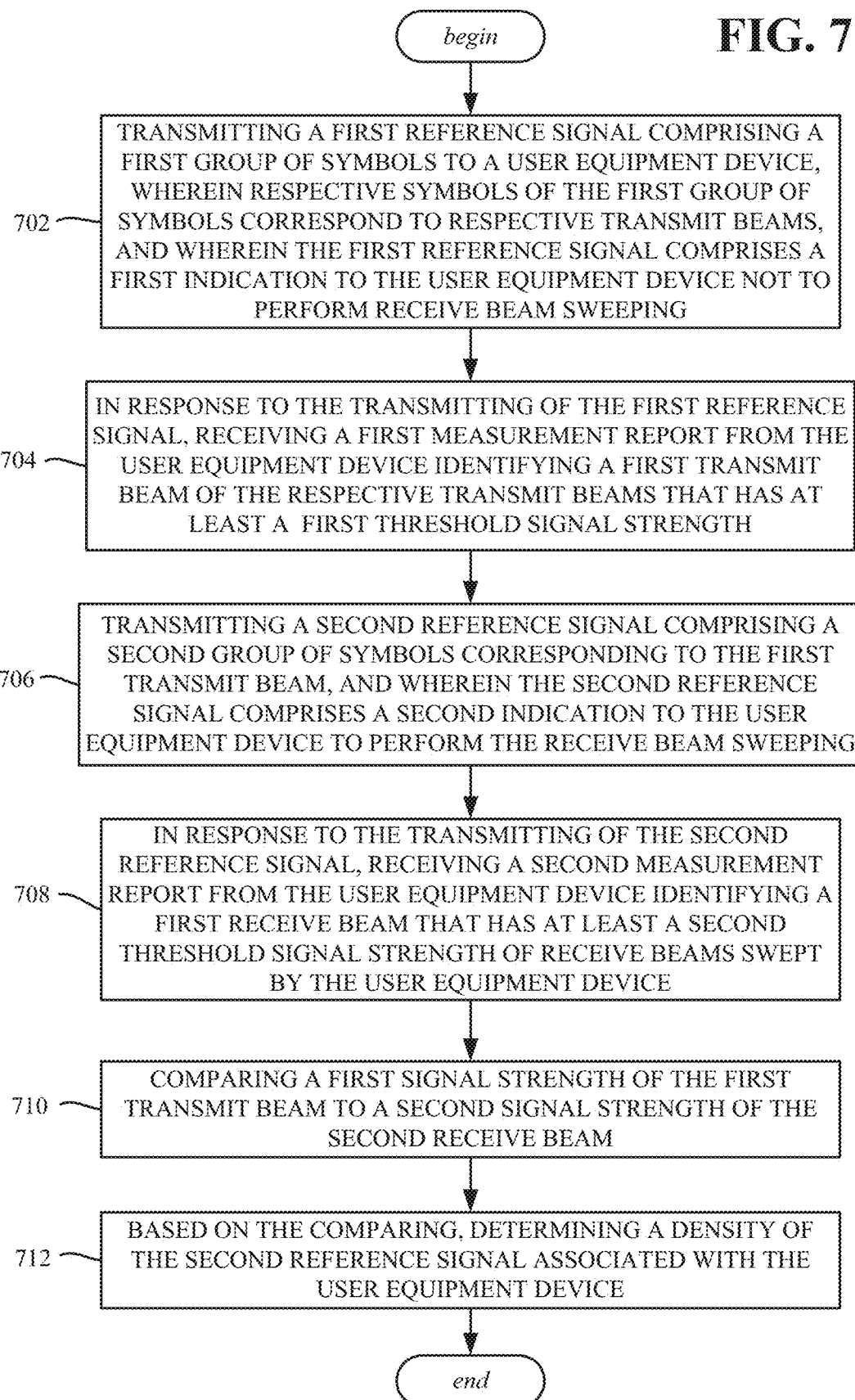
FIG. 7 illustrates example operations a network device for performing outcome-based receiver beam tuning, in accordance with various aspects and embodiments of the subject disclosure.

One or more example aspects are represented in FIG. 7, and can correspond to a network device comprising a processor and a memory that stores executable instructions that, when executed by the processor, facilitate performance of operations and/or components. Example operations comprise operation 702, which represents transmitting a first reference signal comprising a first group of symbols to a user equipment device, wherein respective symbols of the first group of symbols correspond to respective transmit beams, and wherein the first reference signal comprises a first indication to the user equipment device not to perform receive beam sweeping. Operation 704 represents, in response to the transmitting of the first reference signal, receiving a first measurement report from the user equipment device identifying a first transmit beam of the respective transmit beams that has at least a first threshold signal strength. Operation 706 represents transmitting a second reference signal comprising a second group of symbols corresponding to the first transmit beam, and wherein the second reference signal comprises a second indication to the user equipment device to perform the receive beam sweeping. Operation 708 represents, in response to the transmitting of the second reference signal, receiving a second measurement report from the user equipment device identifying a first receive beam that has at least a second threshold signal strength of receive beams swept by the user equipment device. Operation 710 represents comparing a first signal strength of the first transmit beam to a second signal strength of the second receive beam. Operation 712 represents, based on the comparing, determining a reference signal density associated with the user equipment device.

Further operations can comprise determining a periodicity for performance of the receive beam sweeping based on a difference between the first threshold signal strength and the second threshold signal strength. Further operations can comprise determining a periodicity for performance of the receive beam sweeping based on a quality of service indication of an active packet data protocol context associated with the user equipment device. Further operations can comprise determining a periodicity for performance of the receive beam sweeping based on a buffer indication associated with the user equipment device. Further operations can comprise determining a number of symbols in a third reference signal based on the comparing of the first threshold signal strength and the threshold second signal strength.

Figure 8:
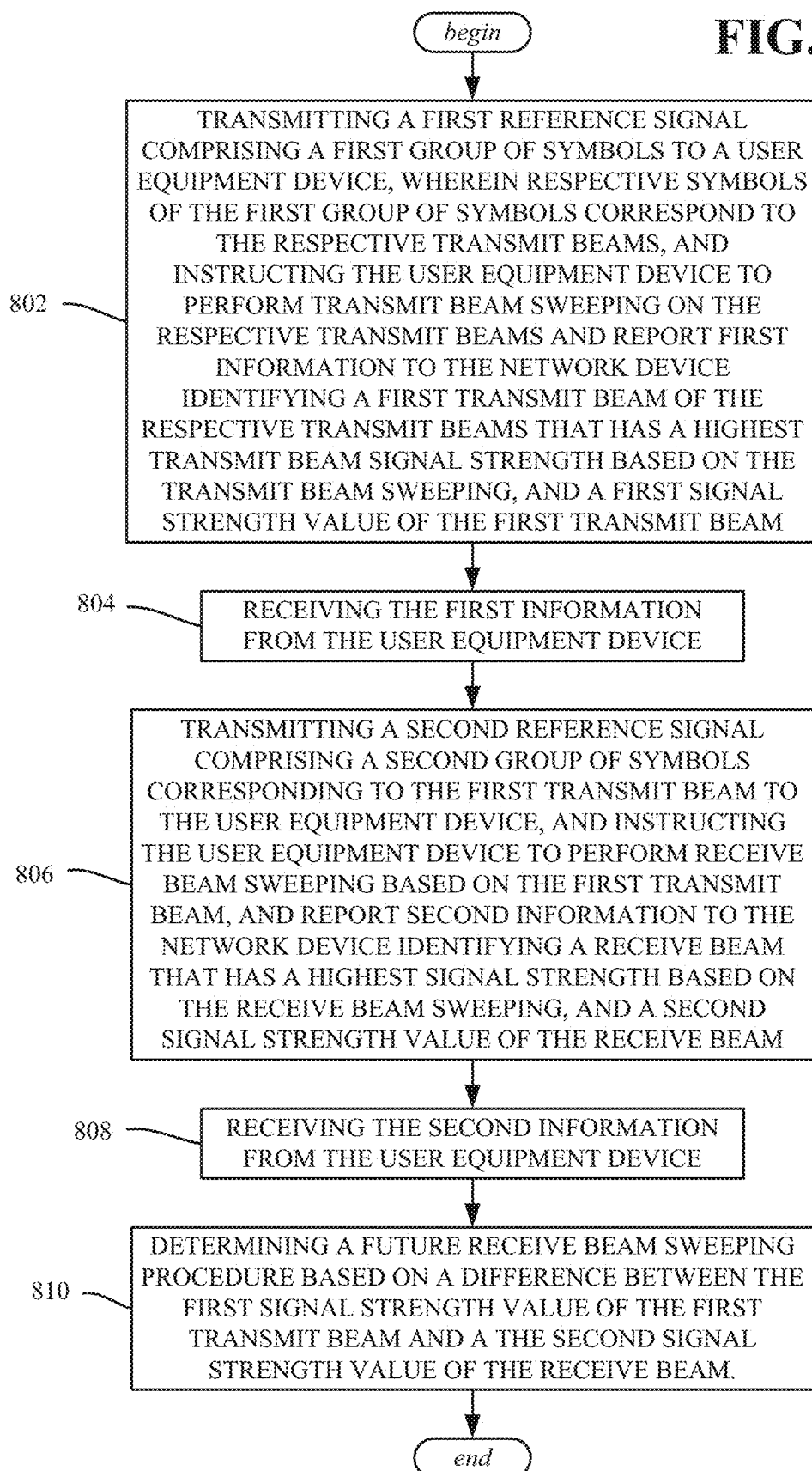
FIG. 8 is a flow diagram showing example operations for outcome-based receiver beam tuning, in accordance with various aspects and embodiments of the subject disclosure.

One or more aspects, such as implemented in a machine-readable storage medium, comprising executable instructions that, when executed by a processor, facilitate performance of operations, are represented in FIG. 8. Example operations comprise operation 802, which represents transmitting a first reference signal comprising a first group of symbols to a user equipment device, wherein respective symbols of the first group of symbols correspond to the respective transmit beams, and instructing the user equipment device to perform transmit beam sweeping on the respective transmit beams and report first information to the network device identifying a first transmit beam of the respective transmit beams that has a highest transmit beam signal strength based on the transmit beam sweeping, and a first signal strength value of the first transmit beam. Operation 804 represents receiving the first information from the user equipment device. Operation 806 represents transmitting a second reference signal comprising a second group of symbols corresponding to the first transmit beam to the user equipment device, and instructing the user equipment device to perform receive beam sweeping based on the first transmit beam, and report second information to the network device identifying a receive beam that has a highest signal strength based on the receive beam sweeping, and a second signal strength value of the receive beam. Operation 808 represents receiving the second information from the user equipment device. Operation 810 represents and determining a future receive beam sweeping procedure based on a difference between the first signal strength value of the first transmit beam and the second signal strength value of the receive beam.

Transmitting the first reference signal can configure the user equipment device for channel state information reference signal reporting with repetition turned off, and transmitting the second reference signal can configure the user equipment device for channel state information reference signal reporting with repetition turned on.

Determining the future receive beam sweeping procedure can comprise determining a periodicity for performance of subsequent receive beam sweeping after the receive beam sweeping based on the first transmit beam. Determining the future receive beam sweeping procedure can comprise determining at least one of: a first periodicity for performance of receive beam sweeping based on a quality of service indication of an active packet data protocol context associated with the user equipment device, and/or a second periodicity for performance of receive beam sweeping based on a buffer indication associated with the user equipment device.

As can be seen, the technology described herein controls a user equipment to report transmit beam tuning (pre receive beam sweeping) signal strength (e.g., RSRP) and the post-receive beam tuning signal strength (e.g., RSRP), which indicates the effectiveness of the receiver beam tuning. The technology described herein controls a user equipment to implement receive beam tuning, while still leaving user equipment vendors the ability to implement proprietary beam sweeping techniques, e.g., to differentiate their products.

Figure 9:
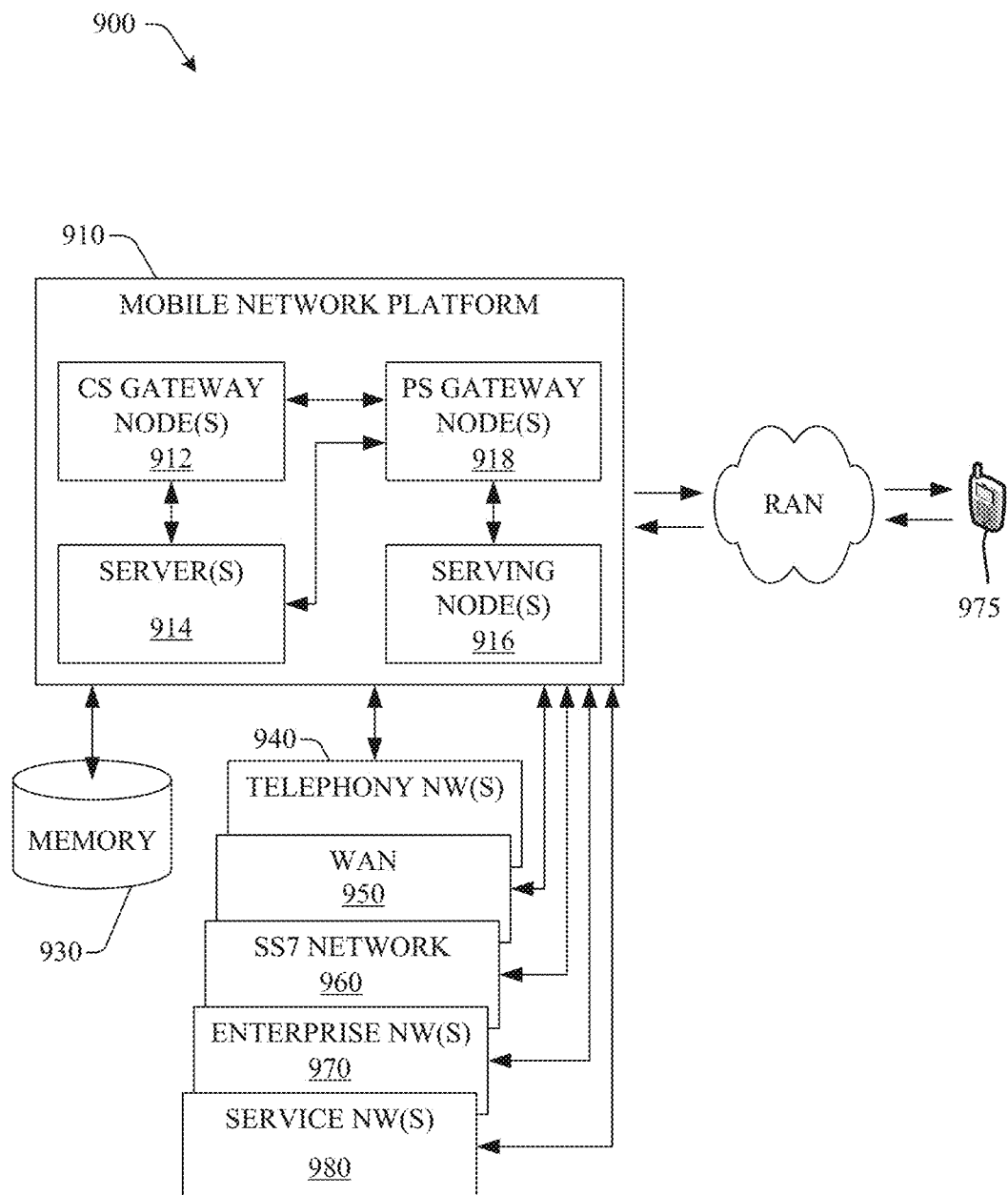
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
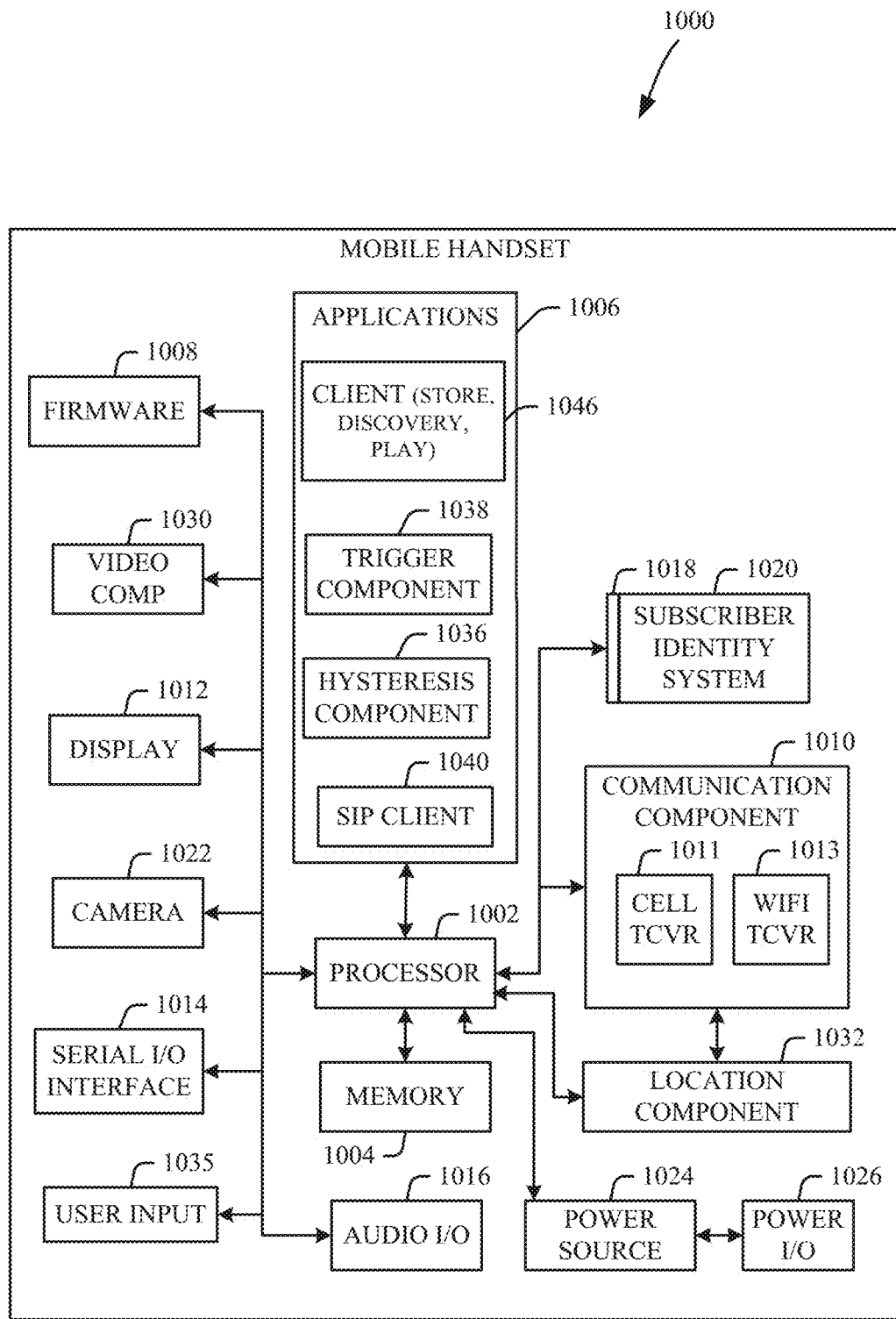
FIG. 10 illustrates an example block diagram of an example user equipment that can be a mobile handset in accordance with various aspects and embodiments of the subject disclosure.

Referring now to FIG. 10, illustrated is a schematic block diagram of an example end-user device such as a user equipment) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
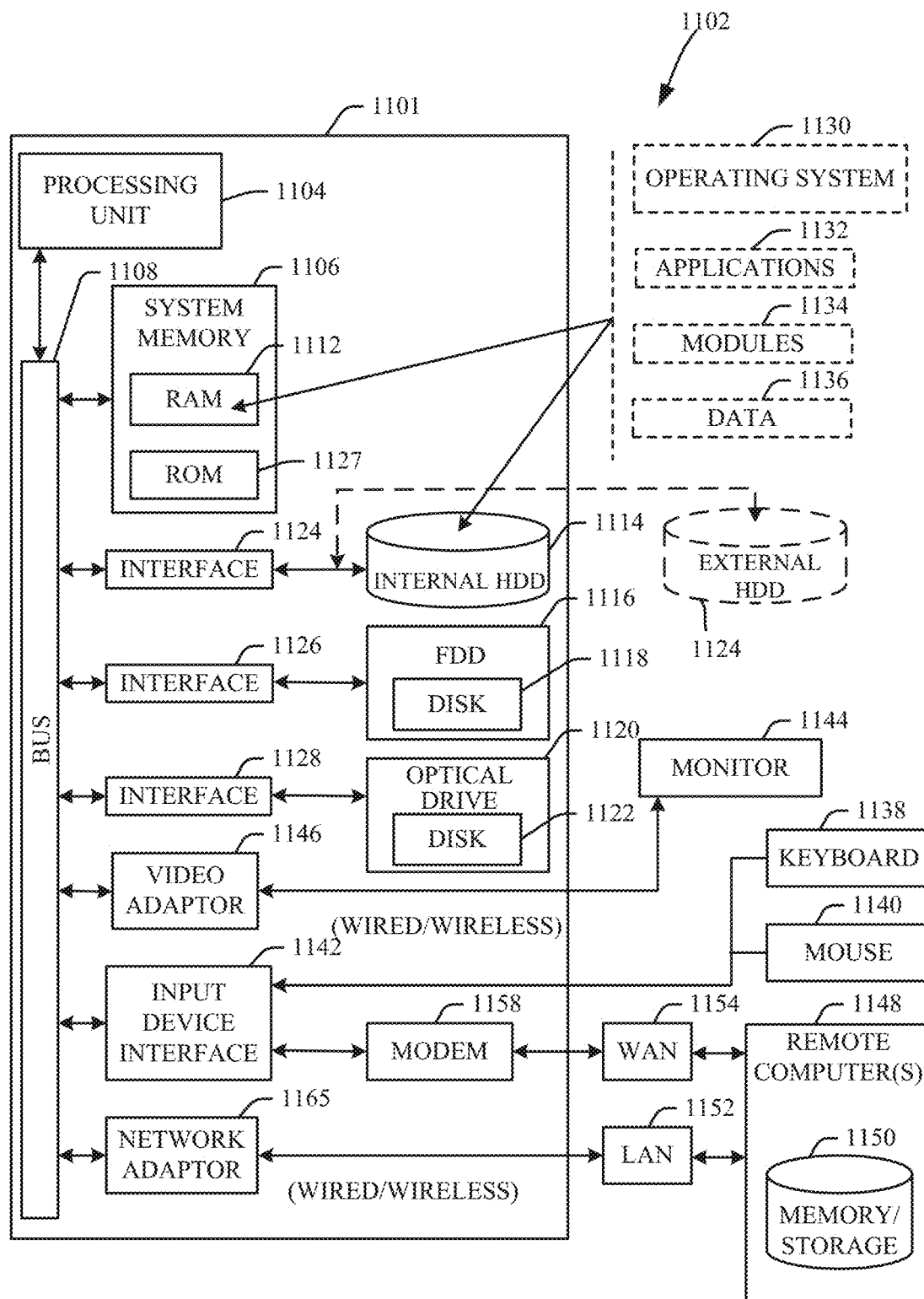
FIG. 11 illustrates an example block diagram of a computer that can be operable to execute processes and methods in accordance with various aspects and embodiments of the subject disclosure.

Referring now to FIG. 11, there is illustrated a block diagram of a computer 1100 operable to execute the functions and operations performed in the described example embodiments. For example, a network node (e.g., network node 116, GNB 202, etc.) may contain components as described in FIG. 11. The computer 1100 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, implementing various aspects described herein with regards to the end-user device can include a computer 1100, the computer 1100 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1127 and random access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the various embodiments can be implemented with various commercially available operating systems or combinations of operating systems.

A user can enter commands and information into the computer 1100 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer 1100 typically includes other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1100 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 9 GHz radio bands, at an 11 Mbps (802.11b) or 94 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising,
instructing, by a network device comprising a processor, a user equipment device to perform transmit beam sweeping on respective transmit beams, and report first information to the network device, the first information identifying a first transmit beam of the respective transmit beams that has a highest transmit beam signal strength based on the transmit beam sweeping, and a first signal strength value of the first transmit beam;
receiving, by the network device, the first information from the user equipment device;
instructing, by the network device, the user equipment device to perform receive beam sweeping corresponding to the first transmit beam, and report second information to the network device, the second information identifying a receive beam that has a highest receive beam signal strength based on the receive beam sweeping, and a second signal strength value of the receive beam;
receiving, by the network device, the second information from the user equipment device; and
determining, by the network device, a future receive beam sweeping procedure based on a difference between the first signal strength value of the first transmit beam and the second signal strength value of the receive beam.

2. The method of claim 1, wherein the instructing the user equipment device to perform the transmit beam sweeping on the respective transmit beams comprises configuring the user equipment device for channel state information reference signal reporting with repetition turned off.

3. The method of claim 1, wherein the instructing the user equipment device to perform the receive beam sweeping comprises configuring the user equipment device for channel state information reference signal reporting with repetition turned on.

4. The method of claim 1, wherein the instructing the user equipment device to perform the transmit beam sweeping on the respective transmit beams comprises transmitting a first reference signal comprising a first group of symbols to the user equipment device, and wherein respective symbols of the first group of symbols correspond to the respective transmit beams.

5. The method of claim 4, wherein the instructing the user equipment device to perform the receive beam sweeping comprises transmitting a second reference signal comprising a second group of symbols corresponding to the first transmit beam.

6. The method of claim 1, wherein the determining the future receive beam sweeping procedure comprises determining a reference signal density corresponding to a subsequent receive beam sweeping operation by the user equipment device after the receive beam sweeping.

7. The method of claim 1, wherein the determining the future receive beam sweeping procedure comprises determining a periodicity for performance of subsequent receive beam sweeping after the receive beam sweeping.

8. The method of claim 1, wherein the determining the future receive beam sweeping procedure is further based on a quality of service indication of an active packet data protocol context associated with the user equipment device.

9. The method of claim 1, wherein the determining the future receive beam sweeping procedure is further based on a buffer indication associated with the user equipment device.

10. The method of claim 1, wherein the determining the future receive beam sweeping procedure comprises determining at least one of: a first periodicity for performance of receive beam sweeping based on a quality of service indication of an active packet data protocol context associated with the user equipment device, or a second periodicity for performance of receive beam sweeping based on a buffer indication associated with the user equipment device.

11. The method of claim 1, wherein the determining the future receive beam sweeping procedure comprises determining a number of orthogonal frequency division multiplexing symbols to configure a non-zero power-channel state information-reference signal.

12. A network device, comprising:
a processor; and
a memory that stores executable instructions that, when executed by the processor, facilitate performance of operations, the operations comprising:
transmitting a first reference signal comprising a first group of symbols to a user equipment device, wherein respective symbols of the first group of symbols correspond to respective transmit beams, and wherein the first reference signal comprises a first indication to the user equipment device not to perform receive beam sweeping;

in response to the transmitting of the first reference signal, receiving a first measurement report from the user equipment device identifying a first transmit beam of the respective transmit beams that has at least a first threshold signal strength;

transmitting a second reference signal comprising a second group of symbols corresponding to the first transmit beam, and wherein the second reference signal comprises a second indication to the user equipment device to perform the receive beam sweeping;

in response to the transmitting of the second reference signal, receiving a second measurement report from the user equipment device identifying a first receive beam that has at least a second threshold signal strength of receive beams swept by the user equipment device;

comparing a first signal strength of the first transmit beam to a second signal strength of a second receive beam; and based on the comparing, determining a reference signal density associated with the user equipment device.

13. The network device of claim 12, wherein the operations further comprise determining a periodicity for performance of the receive beam sweeping based on a difference between the first signal strength and the second signal strength.

14. The network device of claim 12, wherein the operations further comprise determining a periodicity for performance of the receive beam sweeping based on a quality of service indication of an active packet data protocol context associated with the user equipment device.

15. The network device of claim 12, wherein the operations further comprise determining a periodicity for performance of the receive beam sweeping based on a buffer indication associated with the user equipment device.

16. The network device of claim 12, wherein the operations further comprise determining a number of symbols in a third reference signal based on the comparing of the first signal strength and the second signal strength.

17. A non-transitory machine-readable medium, comprising executable instructions that, when executed by a processor of a wireless radio network device, facilitate performance of operations, the operations comprising:

transmitting a first reference signal comprising a first group of symbols to a user equipment device, wherein respective symbols of the first group of symbols correspond to respective transmit beams, and instructing the user equipment device to perform transmit beam sweeping on the respective transmit beams and report first information to the network device identifying a first transmit beam of the respective transmit beams that has a highest transmit beam signal strength based on the transmit beam sweeping, and a first signal strength value of the first transmit beam;

receiving the first information from the user equipment device;

transmitting a second reference signal comprising a second group of symbols corresponding to the first transmit beam to the user equipment device, and instructing the user equipment device to perform receive beam sweeping based on the first transmit beam, and report second information to the network device identifying a receive beam that has a highest signal strength based on the receive beam sweeping, and a second signal strength value of the receive beam;

receiving the second information from the user equipment device; and determining a future receive beam sweeping procedure based on a difference between the first signal strength value of the first transmit beam and the second signal strength value of the receive beam.

18. The non-transitory machine-readable medium of claim 17, wherein the transmitting the first reference signal configures the user equipment device for channel state information reference signal reporting with repetition turned off, and wherein the transmitting the second reference signal configures the user equipment device for channel state information reference signal reporting with repetition turned on.

19. The non-transitory machine-readable medium of claim 17, wherein the determining the future receive beam sweeping procedure comprises determining a periodicity for performance of subsequent receive beam sweeping after the receive beam sweeping based on the first transmit beam.

20. The non-transitory machine-readable medium of claim 17, wherein the determining the future receive beam sweeping procedure comprises determining at least one of: a first periodicity for performance of receive beam sweeping based on a quality of service indication of an active packet data protocol context associated with the user equipment device, or a second periodicity for performance of receive beam sweeping based on a buffer indication associated with the user equipment device.

* * * * *